United States Patent
Dobner (10) Patent No.: US 12,242,741 B2
(45) Date of Patent: Mar. 4, 2025

(54) MEMORY SUB-SYSTEM SIGNATURE GENERATION

(71) Applicant: Micron Technology, Inc., Boise, ID (US)

(72) Inventor: Kelsey J. Dobner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 18/126,846

(22) Filed: Mar. 27, 2023

(65) Prior Publication Data

US 2023/0236743 A1    Jul. 27, 2023

Related U.S. Application Data

(63) Continuation of application No. 17/459,949, filed on Aug. 27, 2021, now Pat. No. 11,635,900.

(51) Int. Cl.
*G06F 12/00* (2006.01)
*G06F 3/06* (2006.01)

(52) U.S. Cl.
CPC .......... *G06F 3/0625* (2013.01); *G06F 3/0653* (2013.01); *G06F 3/0679* (2013.01)

(58) Field of Classification Search
CPC .... G06F 3/0625; G06F 3/0653; G06F 3/0679; G06F 3/0619; G06F 3/0632
See application file for complete search history.

(56) References Cited

U.S. PATENT DOCUMENTS

| | | | |
|---|---|---|---|
| 7,516,267 B2 | 4/2009 | Coulson et al. | |
| 7,958,216 B2* | 6/2011 | Stienhans | G06F 9/442 715/753 |
| 8,316,257 B2 | 11/2012 | Royer et al. | |
| 9,478,271 B2 | 10/2016 | Chen et al. | |
| 10,891,219 B1* | 1/2021 | Dimitropoulos | A63F 13/352 |
| 2002/0091491 A1* | 7/2002 | Jackson | G05B 19/4065 702/56 |
| 2004/0083405 A1* | 4/2004 | Chang | G06F 11/1435 714/24 |
| 2012/0331208 A1* | 12/2012 | Chang | G06F 12/0246 711/E12.008 |
| 2016/0034225 A1* | 2/2016 | Yoon | G06F 3/0619 711/102 |
| 2017/0205451 A1* | 7/2017 | Moinuddin | G01R 31/52 |

(Continued)

FOREIGN PATENT DOCUMENTS

JP    2007206902 A  *  8/2007
KR    20180057687 A *  9/2016

*Primary Examiner* — Shawn X Gu
*Assistant Examiner* — Mohammad S Hasan
(74) *Attorney, Agent, or Firm* — Brooks, Cameron & Huebsch, PLLC (57) ABSTRACT

A method includes receiving signaling indicative of performance of a shutdown operation involving a memory device to a controller resident on the memory device; initiating a power off sequence in response to the received signaling, wherein the power off sequence includes execution of instructions corresponding to a plurality of routines; and writing data comprising respective shutdown signatures associated with execution of the plurality of routines to a media associated with the memory device upon completion of each of one or more of the plurality of routines, wherein the media is bit-addressable or byte-addressable.

16 Claims, 4 Drawing Sheets

(56) References Cited

U.S. PATENT DOCUMENTS

2017/0220354 A1* 8/2017 Valdez .................... G06F 3/065
2018/0233947 A1* 8/2018 Mills ........................ H02J 9/06
2018/0253131 A1* 9/2018 Heinrich ................. G06F 1/263
2019/0214430 A1* 7/2019 Kim ...................... G11C 11/161

* cited by examiner

MEMORY SUB-SYSTEM SIGNATURE GENERATION

PRIORITY INFORMATION

This application is a Continuation of U.S. application Ser. No. 17/459,949, filed on Aug. 27, 2021, the contents of which are incorporated herein by reference.

TECHNICAL FIELD

Embodiments of the disclosure relate generally to memory sub-systems, and more specifically, relate to memory sub-system signature generation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-system signature generation, in particular to memory sub-systems that include a memory sub-system signature generating component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation a memory sub-system can experience a power loss (e.g., an intended power loss or an unintended power loss). As an example, a memory sub-system can experience an asynchronous power loss. As used herein, "asynchronous power loss" can refer to a power loss that is not proceeded by a shutdown notification. When a memory sub-system experiences a power loss, a power-off sequence (e.g., to prepare for a restart) can be initiated.

Upon a memory sub-system experiencing a power loss, a number of routines can be performed prior to the remaining system power being exhausted. As used herein, a "routine" generally refers to a set or sets of instructions that are executed repeatedly during execution of a computing application or other computing program as part of operating a computing system and/or a memory sub-system. As an example, routines, which may also be referred to as firmware routines, firmware methods (or more simply methods), and/or interrupts, for instance, can provide that the system is shut down properly (e.g., in view of the power loss) and provide that the that the system is prepared to restart properly (e.g., again in view of the power loss). However, a failed completion of a routine can lead to data loss and/or a loss of device functionality, for instance, when the device is turned back on.

Previously, when a memory sub-system experienced a power loss and a power-off sequence had been initiated, systems have been connected to debugging tools for analysis. However, it is not always possible to reproduce the power loss and the power-off sequence of interest. Also, some locations, where a device is situated, entirely lack debugging tools for analysis. As such, there are situations where there is not enough system information to determine what has occurred, such as a failed completion of a routine, during the power-off sequence, which may lead to data loss and/or a loss of device functionality.

Aspects of the present disclosure address the above and other deficiencies by writing data comprising respective shutdown signatures associated with execution of one or more routines to a media associated with the memory device upon completion of each of one or more of the routines. In other words, during a power off sequence in which one or more routines are executed, upon completion of a particular routine, data comprising a corresponding shutdown signature is written to the memory device. Further, data comprising a corresponding shutdown signature is not written to the media when the associated routine has failed completion. The data comprising respective shutdown signatures is a completion indicator. Each respective shutdown signature can comprise a sequence of bits and/or bytes that uniquely identifies a particular routine.

Subsequently, the media can be analyzed determine which data comprising respective shutdown signatures was written to the media. If data corresponding to a particular shutdown signatures was not written to the media, it can be determined that the associated routine has failed completion. Determining that a particular routine has failed completion can reduce the need for debugging tools for analysis, can provide a starting point for a restorative process, and/or can reduce the need for debugging personnel to be on location (e.g., as the determination of which data is and/or isn't written to the media may be conducted remotely).

Figure 1:
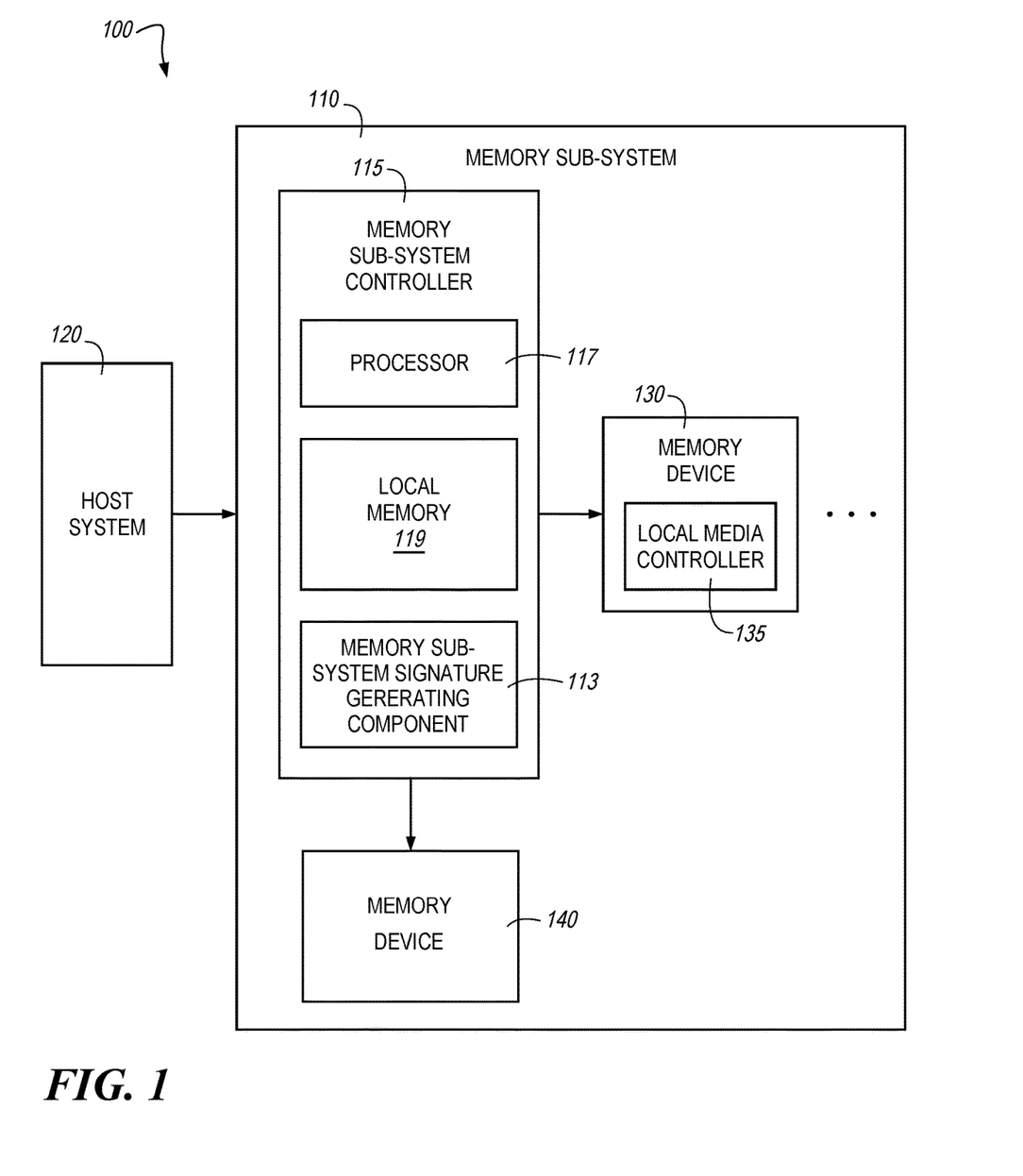
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, an enterprise device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell.

Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a signature generating component 113. Although not shown in FIG. 1 so as to not obfuscate the drawings, the signature generating component 113 can include various circuitry to facilitate receiving signaling indicative of performance of a shutdown operation involving a memory device to a controller resident on the memory device, initiating a power off sequence in response to the received signaling, wherein the power off sequence includes execution of instructions corresponding to a plurality of routines, and writing data comprising respective shutdown signatures associated with execution of the plurality of routines to a media associated with the memory device upon completion of each of one or more routines, wherein the media is bit-addressable or byte-addressable. In some embodiments, the signature generating component 113 can include special purpose circuitry in the form of an ASIC, FPGA, state machine, and/or other logic circuitry that can allow the signature generating component 113 to orchestrate and/or perform operations to selectively perform signature generating operations for the memory device 130 and/or the memory device 140 based on receiving signaling indicative of performance of a shutdown operation involving a memory device to a controller resident on the memory device and initiating a power off sequence in response to the received signaling, wherein the power off sequence includes execution of instructions corresponding to a plurality of routines.

In some embodiments, the memory sub-system controller 115 includes at least a portion of the signature generating component 113. For example, the memory sub-system controller 115 can include a processor 117 (processing device) configured to execute instructions stored in local memory 119 for performing the operations described herein. In some embodiments, the signature generating component 113 is part of the host system 110, an application, or an operating system.

In a non-limiting example, an apparatus (e.g., the computing system 100) can include a memory sub-system signature generating component 113. The memory sub-system signature generating component 113 can be resident on the memory sub-system 110. As used herein, the term "resident on" refers to something that is physically located on a particular component. For example, the memory sub-system signature generating component 113 being "resident on" the memory sub-system 110 refers to a condition in which the hardware circuitry that comprises the memory sub-system signature generating component 113 is physically located on the memory sub-system 110. The term "resident on" can be used interchangeably with other terms such as "deployed on" or "located on," herein.

The memory sub-system signature generating component 113 can be configured to receive signaling indicative of performance of a shutdown operation for memory components of the memory sub-system, initiate a power off sequence in response to the received signaling to at least one of the memory components, and write data comprising respective shutdown signatures associated with execution of routines to a media associated with the memory device upon completion of each of one or more of the routines. As described above, the memory components can be memory dice or memory packages that form at least a portion of the memory device 130.

The memory sub-system signature generating component 113 that can be further configured to abstain from writing data (e.g., not write data) comprising a respective shutdown signature associated with the execution of the routines upon a failed completion of one or more of the routines. Subsequent analysis of written data comprising respective shutdown signatures can be used to determine which of the routines has completed. Similarly, a lack of data comprising respective shutdown signatures (e.g., data that has not been written) can be used to determine which of the routines has not completed. As previously mentioned, determining that a particular routine has failed completion can reduce the need for debugging tools for analysis, can provide a starting point for a restorative process, and/or can reduce the need for debugging personnel to be on location.

In some embodiments, the memory sub-system signature generating component 113 can be further configured to perform a locking operation upon the failed completion of one of the plurality of routines. The locking operation can be utilized to suspend access to a memory device (e.g., memory device 130 and/or memory device 140). As previously mentioned, a failed completion of a routine can lead to data loss and/or a loss of device functionality, for instance, when the device is turned back on. The locking operation can help prevent data loss and/or a loss of device functionality by suspending access to a memory device until a restorative process can be completed, for instance. The restorative process can rectify issues associated with a power loss and/or power off sequence. Also, in some embodiments, the memory sub-system signature generating component 113 can be further configured to abort the power off sequence when one of the plurality of routines is not completed (e.g., fails completion).

In another non-limiting example, a system (e.g., the computing system 100) can include a memory sub-system 110 comprising memory components arranged to form a stackable cross-gridded array of memory cells. A processing device (e.g., the processor 117 and/or the local media controller 135) can be coupled to the memory components and can perform operations comprising receiving signaling indicative of performance of a shutdown operation for memory components of the memory sub-system, initiating a power off sequence in response to the received signaling to at least one of the memory components, and writing data comprising respective shutdown signatures associated with execution of the plurality of routines to a media associated with the memory device upon completion of each of one or more of the plurality of routines. The processing device can be further configured to abort the power off sequence when one of the plurality of routines is not completed (e.g., fails completion). The processing device can be further configured to perform one or more operations as discussed herein.

Figure 2:
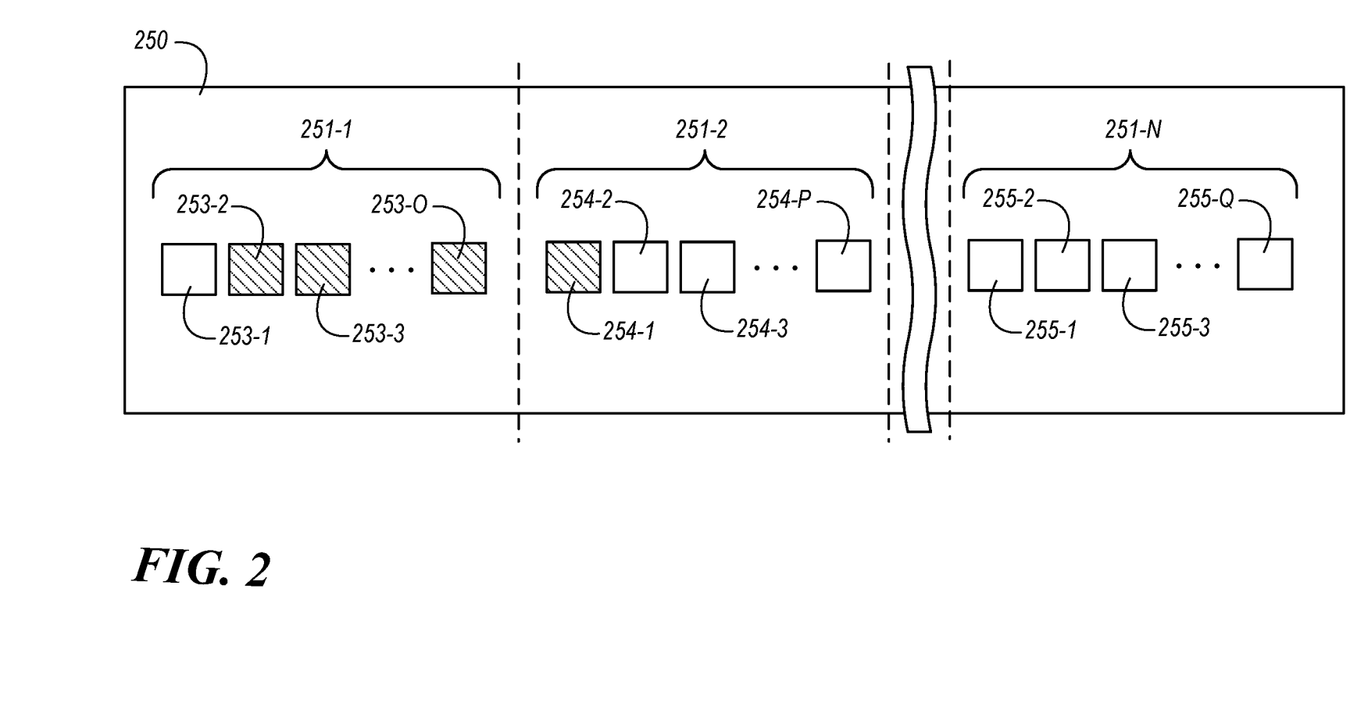
FIG. 2 is a block diagram of a portion of a memory sub-system in accordance with some embodiments of the present disclosure.

FIG. 2 is a block diagram of a portion of a memory sub-system in accordance with some embodiments of the present disclosure. FIG. 2 illustrates a media 250 (e.g., memory device 130 shown in FIG. 1).

Embodiments of the present disclosure provide that the media 250 is a bit-addressable media or byte-addressable media, in contrast to block addressable and/or page addressable media for instance. As used herein "bit-addressable media" refers to a media wherein a single bit is selectable (e.g., for a write operation). As used herein "byte-addressable media" refers to a media wherein a single byte is selectable (e.g., for a write operation). Providing that the media 250 is a bit-addressable media or byte-addressable media can provide that writing a respective shutdown signature to the media 250 upon completion of each of one or more of the plurality of routines utilizes significantly less time, as compared to a different media that is not bit-addressable or byte-addressable. Also, providing that the media 250 is a bit-addressable media or byte-addressable media can provide that writing a respective shutdown signature to the media 250 upon completion of each of one or more of the plurality of routines utilizes less power, as compared to a different media that is not bit-addressable or byte-addressable. Utilizing relatively less time and/or power can provide that a respective shutdown signature is written quickly, such that a number of remaining routines associated with a shutdown may be performed. Because power available for operations can be limited due to a power loss, a shutdown operation, and/or a power off sequence, lower power utilizations can be advantageous. For instance, lower power utilizations for a number of operations can help provide that sufficient power is available to perform intended operations.

The media 250 can include a number of locations 251-1, 251-2, . . . 251-N that can be utilized for data comprising respective shutdown signatures. "N" is an integer that can have different values for various applications. The number of locations 251-1, 251-2, . . . 251-N can correspond to a number of routines and/or subroutines. For example, a power off sequence can include "N" routines and/or subroutines. As shown in FIG. 2, location 251-1 can correspond to a location of a first shutdown signature corresponding to a first routine and/or subroutine, location 251-2 can correspond to a location of a second shutdown signature corresponding to a second routine and/or subroutine, and location 251-N can correspond to a location of a $N^{th}$ shutdown signature corresponding to a $N^{th}$ routine and/or subroutine.

The number of locations 251-1, 251-2, . . . 251-N of media 250 can be reserved (e.g., pre-allocated) for shutdown signatures. In other words, one or more embodiments provide that only data comprising respective shutdown signatures associated with execution of routines and/or subroutines is written to a media 250 locations 251-1, 251-2, . . . 251-N upon completion of each of one or more of the routines and/or subroutines. Reserving the number of locations 251-1, 251-2, . . . 251-N of media 250 for shutdown signatures can facilitate a later analysis, for instance, to determine which data comprising respective shutdown signatures was written to the media 250 and/or was not written to the media 250, to assess whether a routine and/or subroutine has failed completion. Reserving the number of locations 251-1, 251-2, . . . 251-N of media 250 for shutdown signatures can facilitate lower power utilizations due to a power loss, a shutdown operation, and/or a power off sequence.

The number of locations 251-1, 251-2, . . . 251-N of media 250 can be sequential. As such, data comprising respective shutdown signatures that is written to the media 250 is written sequentially (e.g., without intervening data) to the media 250. Sequentially writing data comprising respective shutdown signatures to the media 250 can facilitate lower power utilizations due to a power loss, a shutdown operation, and/or a power off sequence and/or can facilitate a later analysis, for instance, to determine which data comprising respective shutdown signatures was written to the media 250 and/or was not written to the media 250, to assess whether a routine and/or subroutine has failed completion.

As shown in FIG. 2, the number of locations 251-1, 251-2, . . . 251-N each comprise a number of respective units. Location 251-1 comprises units 253-1, 253-2, . . . 253-O, location 251-2 comprises units 254-1, 254-2, . . . 254-P, and location 251-N comprises units 255-1, 255-2, . . . 255-Q. Embodiments provide that the respective units illustrated in FIG. 2 can correspond to bits, bytes (as previously mentioned the media 250 is bit-addressable or byte-addressable), or memory cells. "O", "P", and "Q" are integers that can have different values for various applications. The number of locations 251-1, 251-2, . . . 251-N can have the same or differing numbers of respective units. For instance, "O", "P", and "Q" can independently be the same or different from one another.

As shown in FIG. 2, data comprising respective shutdown signatures has been written to the media 250 corresponding to locations 251-1 and 251-2; data comprising a respective shutdown signature has not been written to the media 250 corresponding to location 251-N. One or more embodiments provide that data comprising a respective shutdown signature that is written to the media 250 meets a threshold energy consumption criteria. For instance, the threshold energy consumption criteria can provide that a minimum power consumption is utilized to write each respective shutdown signature to the media 250 (e.g., by providing that a minimum programming voltage is utilized and/or that a minimum number of cells are programmed from their erased state when writing each respective shutdown signature to the media 250).

Figure 3:
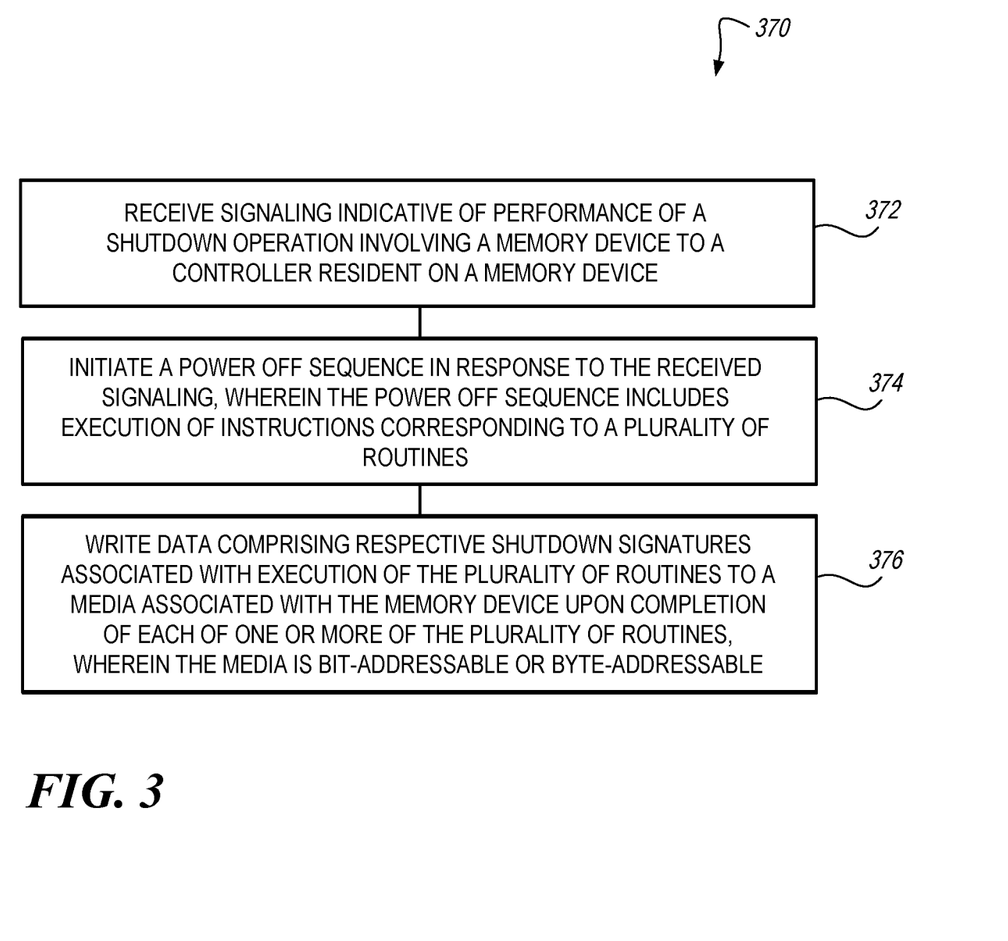
FIG. 3 is a flow diagram corresponding to a method for memory sub-system signature generation in accordance with some embodiments of the present disclosure.

FIG. 3 is flow diagram corresponding to a method 370 for signature generation in accordance with some embodiments of the present disclosure. The method 370 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 370 is performed by the signature generating component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 372, signaling indicative of performance of a shutdown operation involving a memory device to a controller resident on the memory device can be received. The signaling indicative of performance of a shutdown operation can be responsive to a power loss (e.g., an asynchronous power loss) to a number of memory components of a memory sub-system. In some embodiments, the memory sub-system can be analogous to the memory sub-system 110 illustrated in FIG. 1. As described above, the memory components can be memory dice or memory packages that are coupled to one another to create an array of memory cells, such as a three-dimensional stackable cross-gridded array of memory cells used by the memory sub-system to store data.

At operation 374, a power off sequence can be initiated in response to the received signaling, wherein the power off sequence includes execution of instructions corresponding to a plurality of routines. The plurality of routines can provide that the system is shut down properly (e.g., in view of the power loss) and provide that the that the system is prepared to restart properly (e.g., again in view of the power loss). However, a failed completion of a routine can lead to data loss and/or a loss of device functionality, for instance, when the device is turned back on. Different routines may be utilized for various applications.

At operation 376, data comprising respective shutdown signatures associated with execution of the plurality of routines can be written to a media associated with the memory device upon completion of each of one or more of the plurality of routines, wherein the media is bit-addressable or byte-addressable. The respective shutdown signatures can each comprise a unique series of bits and/or bytes. Writing data comprising a particular shutdown signature to the media indicates that a particular routine has been completed.

In some embodiments, the method 370 can include that data comprising a respective shutdown signature associated with the execution of the plurality of routines to the media associated with the memory device is not written to the media associated with the memory device upon a failed completion of one of the plurality of routines. Not writing data comprising a particular shutdown signature to the media indicates that a particular routine has failed completion.

One or more embodiments provide that data comprising a portion of a respective shutdown signature is written to the media associated with the memory device upon completion of a portion of a particular routine and that data comprising a different portion of a respective shutdown signature is not written to the media associated with the memory device upon a failed completion of a different portion of the particular routine. In other words, a particular routine can have multiple portions, and that particular routine can have a respective shutdown signature with corresponding multiple portions. When a portion of a particular routine is completed, data corresponding to a portion of the respective shutdown signature can be written to the media. When a portion of a particular routine fails completion, data corresponding to a portion of the respective shutdown signature is not written to the media.

In some embodiments, the method 370 can include that a locking operation is performed upon the failed completion of one of the plurality of routines. As previously mentioned, the locking operation can be utilized to suspend access to a memory device (e.g., memory device 130 and/or memory device 140 shown in FIG. 1). A failed completion of a routine can lead to data loss and/or a loss of device functionality, for instance, when the device is turned back on. The locking operation can help prevent data loss and/or a loss of device functionality by suspending access to a memory device until a restorative process can be completed, for instance.

In some embodiments, the method 370 can include that the media is accessed to determine which of the plurality of routines have been completed. For instance, the media can be analyzed to determine which data comprising respective shutdown signatures was written to the media and/or was not written to the media, to assess whether a routine and/or subroutine has failed completion. To determine that a particular routine has failed completion can reduce the need for debugging tools for analysis, can provide a starting point for a restorative process, and/or can reduce the need for debugging personnel to be on location (e.g., as the determination of which data is and/or isn't written to the media may be conducted remotely).

In some embodiments, the method 370 provides that the signaling indicative of performance of the shutdown operation involving the memory device corresponds to an asynchronous power loss. As mentioned, "asynchronous power loss" can refer to a power loss that is not proceeded by a shutdown notification. In other words, the asynchronous power loss can be an unintended power loss.

In some embodiments, the method 370 provides that the media is a non-volatile media on an enterprise computing device. Enterprise computing devices are generally higher performance than consumer computing devices. Enterprise computing devices can sustain heavy workloads to help ensure that organizations have faster access to their data.

Figure 4:
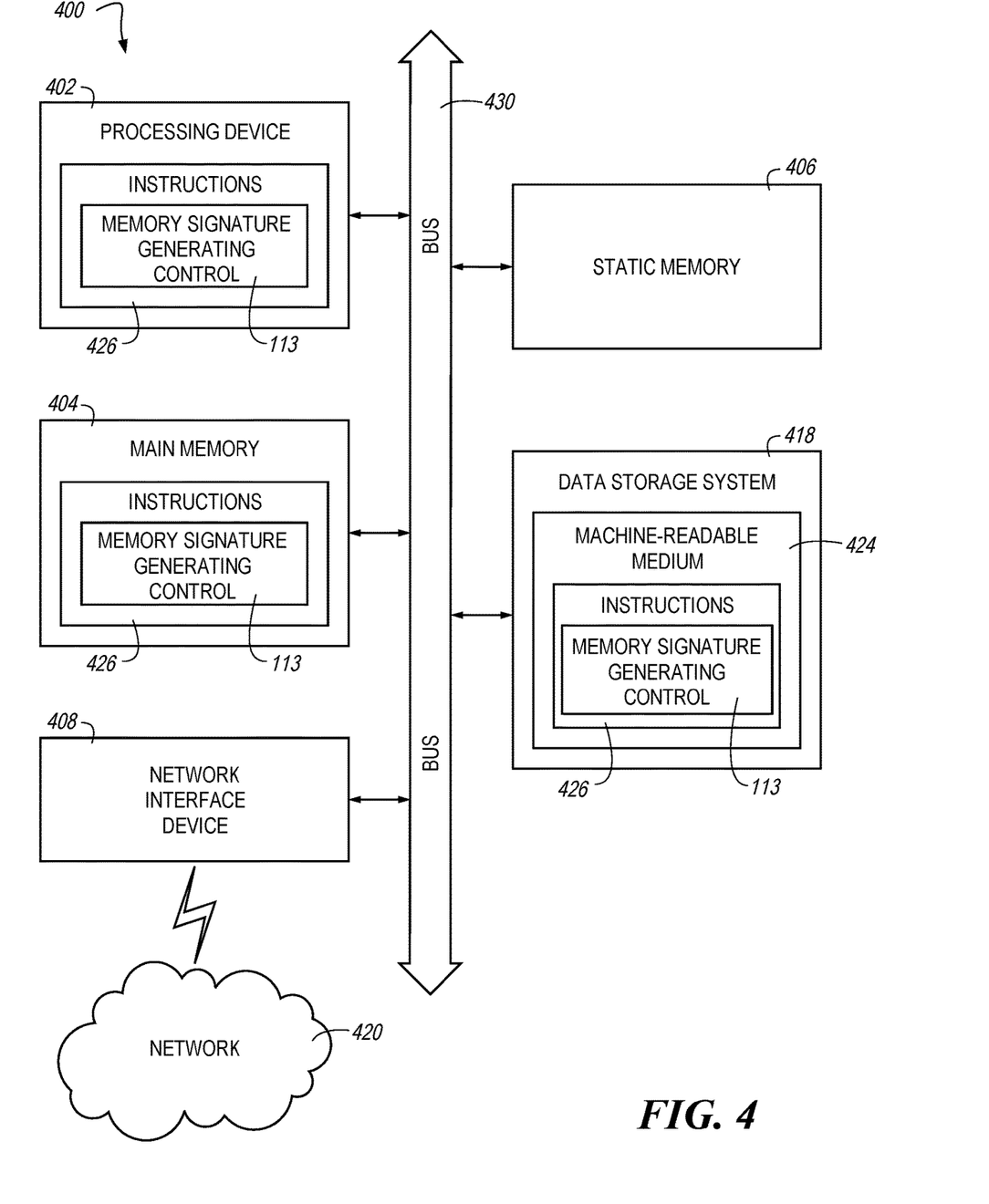
FIG. 4 is a block diagram of an example computer system in which embodiments of the present disclosure may operate.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the signature generating component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a signature generating component (e.g., the signature generating component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    initiating a sequence in response to a signal indicative of performance of a shutdown operation, wherein the sequence includes execution of instructions corresponding to a plurality of routines;
    writing data comprising respective shutdown signatures associated with execution of the plurality of routines to a media upon completion of each of one or more of the plurality of routines, wherein the media is bit-addressable or byte-addressable;
    upon a failed completion of one of the plurality of routines, abstaining from writing data comprising a respective shutdown signature associated with the execution of the plurality of routines to the media, and performing a locking operation.

2. The method of claim 1, further comprising accessing the media to determine which of the plurality of routines have been completed.

3. The method of claim 1, wherein the signaling corresponds to an asynchronous power loss.

4. The method of claim 1, wherein the media is a non-volatile media on an enterprise computing device.

5. An apparatus, comprising:
    a memory device; and
    a controller coupled to the memory device and configured to:
        initiate a sequence in response to a signal indicative of performance of a shutdown operation, wherein the sequence includes a plurality of routines; and
        write a respective shutdown signature to a media upon completion of each of one or more of the plurality of routines, wherein the respective shutdown signature comprises a respective indicator for each of a number of subroutines, wherein the respective indicator corresponds to completion of execution of each of the number of subroutines.

6. The apparatus of claim 5, wherein the media is bit-addressable or byte-addressable.

7. The apparatus of claim 5, wherein the controller is configured to abstain from writing a respective shutdown signature to the media upon a failed completion of one of the plurality of routines.

8. The apparatus of claim 5, wherein the memory subsystem comprises a solid-state drive.

9. The apparatus of claim 5, wherein the controller is configured to write the respective shutdown signature that meet a threshold energy consumption criteria.

10. The apparatus of claim 5, wherein the apparatus comprises an enterprise system and includes a stackable cross-gridded array of memory cells.

11. A non-transitory computer-readable storage medium comprising instructions that, when executed by a processing device, cause the processing device to:
    initiate a sequence in response to a signal indicative of performance of a shutdown operation, wherein the power off sequence includes a plurality of routines;
    store a respective shutdown signature to a media upon completion of each of one or more of the plurality of routines; and
    abort the sequence when one of the plurality of routines is not completed.

12. The medium of claim 11, wherein the respective shutdown signature is stored at a portion of the non-volatile media that is reserved for shutdown signatures.

13. The medium of claim 12, wherein respective shutdown signatures are stored sequentially at the portion of the media that is reserved for shutdown signatures.

14. The medium of claim 11, wherein aborting the sequence when one of the plurality of routines is not completed further comprises not locking one or more of a plurality of memory components.

15. The medium of claim 11, wherein aborting the sequence when one of the plurality of routines is not completed comprises aborting the sequence when a subroutine of one of the plurality of routines is not completed.

16. The medium of claim 11, wherein the media is non-volatile and is bit addressable or byte addressable.

* * * * *